United States Patent [19]

Gates et al.

[11] E Re. 29,335

[45] Reissued Aug. 2, 1977

[54] APPARATUS FOR AUTOMATICALLY ATTACHING A PATCH TO A COMMERCIAL DOCUMENT

[75] Inventors: Robert R. Gates, Rochester; Dunham B. Seeley, Fairport, both of N.Y.

[73] Assignee: Burroughs Corporation, Detroit, Mich.

[21] Appl. No.: 715,670

[22] Filed: Aug. 19, 1976

Related U.S. Patent Documents

Reissue of:

[64] Patent No.: 3,833,448
Issued: Sept. 3, 1974
Appl. No.: 287,336
Filed: Sept. 8, 1972

[51] Int. Cl.[2] ..... B44C 3/00; B32B 35/00

[52] U.S. Cl. ..... 156/541; 156/584; 156/DIG. 40

[58] Field of Search ..... 156/540, 541, 542, 566, 156/584, DIG. 33, DIG. 40

[56] References Cited

U.S. PATENT DOCUMENTS

| | | | |
|---|---|---|---|
| 3,271,227 | 9/1966 | Jaeckel | 156/541 |
| 3,721,601 | 3/1973 | Pituch et al. | 156/542 |
| 3,785,909 | 1/1974 | Stageberg | 156/541 |

*Primary Examiner*—Charles E. Van Horn
*Assistant Examiner*—Michael W. Ball
*Attorney, Agent, or Firm*—David R. Syrowik; Carl Fissell, Jr.; Kevin R. Peterson

[57] ABSTRACT

The present invention relates to a magnetic patch attaching device wherein a continuous roll or reel of adhesively backed magnetic stripes are arranged so that introduction of a document into the machine by means of which the stripe is to be attached permits the reel of tape to be advanced in such manner that an individual stripe is peeled away from the backing tape and applied to the document while the latter is simultaneously withdrawn from the apparatus, the tape being pressure bonded to the surface of the document during withdrawal of the document, leaving the apparatus available for the introduction of the next document.

12 Claims, 7 Drawing Figures

APPARATUS FOR AUTOMATICALLY ATTACHING A PATCH TO A COMMERCIAL DOCUMENT

Matter enclosed in heavy brackets [ ] appears in the original patent but forms no part of this reissue specification; matter printed in italics indicates the additions made by reissue.

BACKGROUND OF THE INVENTION

The present invention relates to a magnetizable label or patch attaching means for automatically, adhesively securing a magnetizable strip of material to a commercial document such, for example, as a savings bank passbook at a precise location thereon without accumulating tape feed error and without leaving partially exposed adhesive at the end of the feeding cycle.

No prior art device is known for performing precisely the same function as that of the present invention. Prior art apparatus for dispensing, printing, and/or attaching labels of one kind or another are not easily and/or efficiently adaptable to perform the present functions without a complete redesign of such device if, in fact, the presently sought end results could thereby be achieved at all.

It is an important and primary object of the present invention, therefore, to provide label and/or patch dispensing and adhering apparatus wherein adhesively backed items such as labels or patches carrying magnetizable material thereon are precisely and accurately aligned with respect to an edge portion of a savings bank passbook. The apparatus of the invention includes means for adhesively bonding the label or patch to the passbook cover as the passbook is automatically extracted or withdrawn from the apparatus to provide for the extra passbook label application.

SUMMARY OF THE INVENTION

In accordance with the present invention, there is provided a magnetizable adhesive label or patch dispensing and attaching apparatus comprising a storage reel for a continuous magnetizable label carrying tape, means for advancing the tape into juxtaposition with an item such as a savings bank passbook to the surface of which said label or patch is to be attached, clutch means operable upon engagement with said item for releasing said advancing means, and means for causing said label or patch to peel away from the carrier tape to which it is temporarily secured and for pressure bonding said label or patch to said passbook cover at a precisely defined and oriented location thereon while concurrently and simultaneously ejecting the passbook from the apparatus.

PREFERRED EMBODIMENT OF THE INVENTION

The magnetic patch attaching apparatus 10 of the present invention, as shown in one or more of the various views of the accompanying drawings, comprises a rigid vertical supporting structural member 12 secured, for example, as by bolts or otherwise in conventional fashion to a rigid, flat, horizontally disposed frame member 14 forming a base for the apparatus. A suction cup 16 of rubber or other suitable or similar material is secured at each corner of the substantially rectangular base member 14 and all four cups act to prevent the apparatus from shifting or moving during operation thereof as will become clearly apparent as the description proceeds. The vertical wall member 12 provides attachment and support means for the various fixed and movable elements of the present invention as will now be described in more detail.

Figure 1:
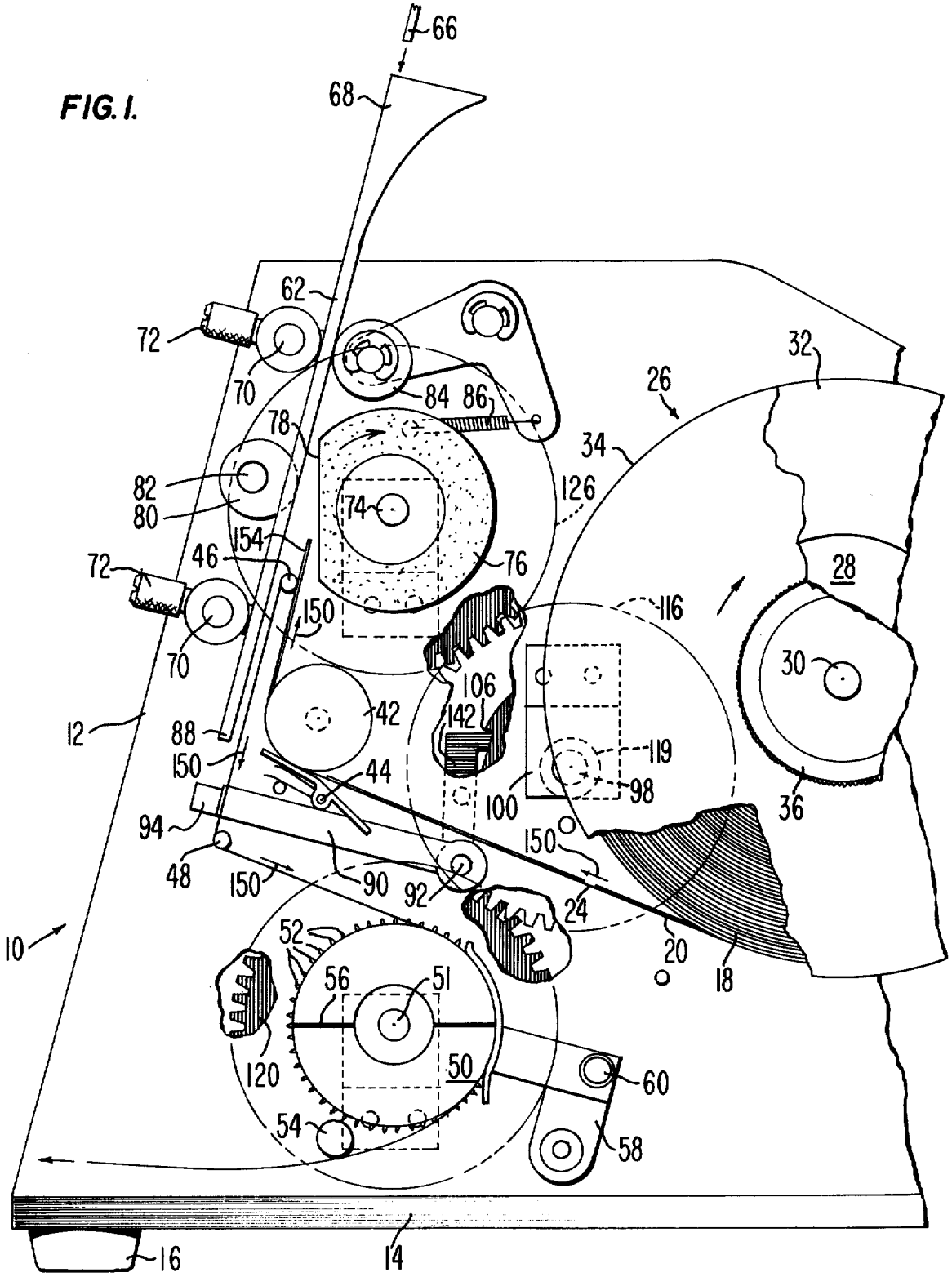
FIG. 1 is an elevational view of the dispensing apparatus of the invention with portions partly broken away to expose internal cooperating elements.
Figure 6:
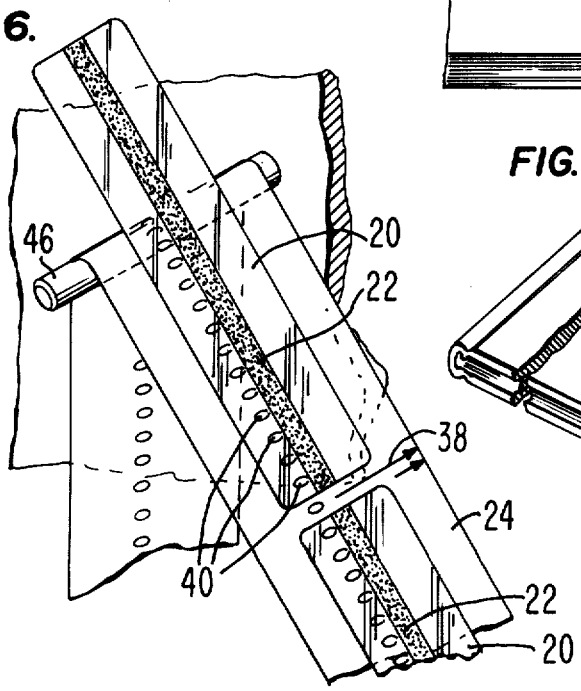
FIG. 6 is an enlarged detail isometric view of a portion of the mechanism shown in FIG. 1 illustrating the magnetic label being peeled away from the backing tape.
Figure 7:
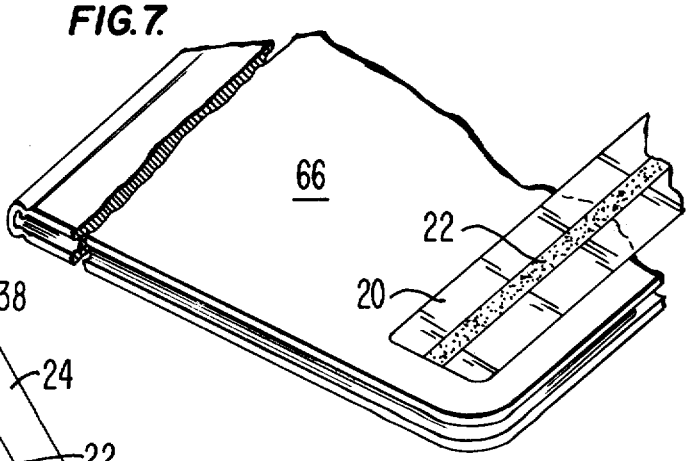
FIG. 7 is an enlarged detail view of a portion of a bank passbook with a label attached thereto.

Referring first to FIG. 1 of the drawings, a roll 18 of pressure sensitive adhesive items, for example labels or patches 20, die cut, carrying a magnetizable stripe 22 thereon, see FIGS. 6 and 7, are attached to a continuous length of release paper 24 in a manner to be described shortly. A supply reel 26 for tape roll 18 is rotatably mounted, by means of an enlarged patch roll arbor 28, onto threaded shaft 30 projecting horizontally, outwardly away from vertical wall member 12. Supply reel 26 includes a fixed reel or flange member 32 and a demountable flange or reel member 34, the latter being secured as a retaining member against the tape roll 18 to retain the same on the shaft by means of a thumb nut 36 threadedly engaged over the shaft 30.

Typically, the patch or label is 2¼ inches long by ½ inch wide. The magnetizable material is a stripe 2¼ inches long by 0.080 inches in width. The individual patches are spaced apart longitudinally from one another along the release paper tape 24 at intervals of ¼ inch. In order to synchronize the movement of the tape and stripe with the means for advancing the same, an identifying mark 38, FIG. 6, such as an arrow is located on the tape and identifies a hole 40 in the tape located adjacent the leading edge of the stripe 22 for purposes which will become apparent as the description proceeds. The release tape 24 is approximately ¾ inch wide and is adapted to be pin or sprocket fed in a manner still to be described, and to this end is provided with the previously identified sprocket holes 40 punched along one edge thereof adjacent and parallel to the magnetizable stripe 22 as seen most clearly in FIG. 6 of the drawings.

The tape carrier 24 is fed from the supply reel 26 to and around a highly polished fixed turn bar or drum 42 against the press of a flat, plate-like spring biased pressure or hold foot 44 rockably pivoted into engagement with the tape surface. The tape then passes vertically, upwardly and then sharply backwardly, in reverse direction, around an upper fixed guide pin 46, thence downwardly and around lower fixed guide pin 48 rightwardly to and around sprocket drive wheel 50 in a manner to engage the sprocket holes 40 of the tape 24 with the projecting pins 52 of the sprocket wheel 50 to be finally peeled away therefrom and ejected leftwardly over the stripper pin 54 at the base of the machine.

In order that the magnetic stripe is properly and accurately aligned with the precise area of the document to which it is to be applied, the sprocket wheel side surface is provided with identifying means 56 such, for example, as a grooved line which is alignable with the arrow mark 38 providing a witness mark for the hole 40 located adjacent the leading edge of the magnetic stripe 22. An arcuately pivoted hold down member 58 curved to closely fit the contour of the wheel 50 is rockable by means of the thumb nut 60 toward and away from the wheel to hold or release the tape as designed, i.e., when loading and unloading the tape.

Figure 2:
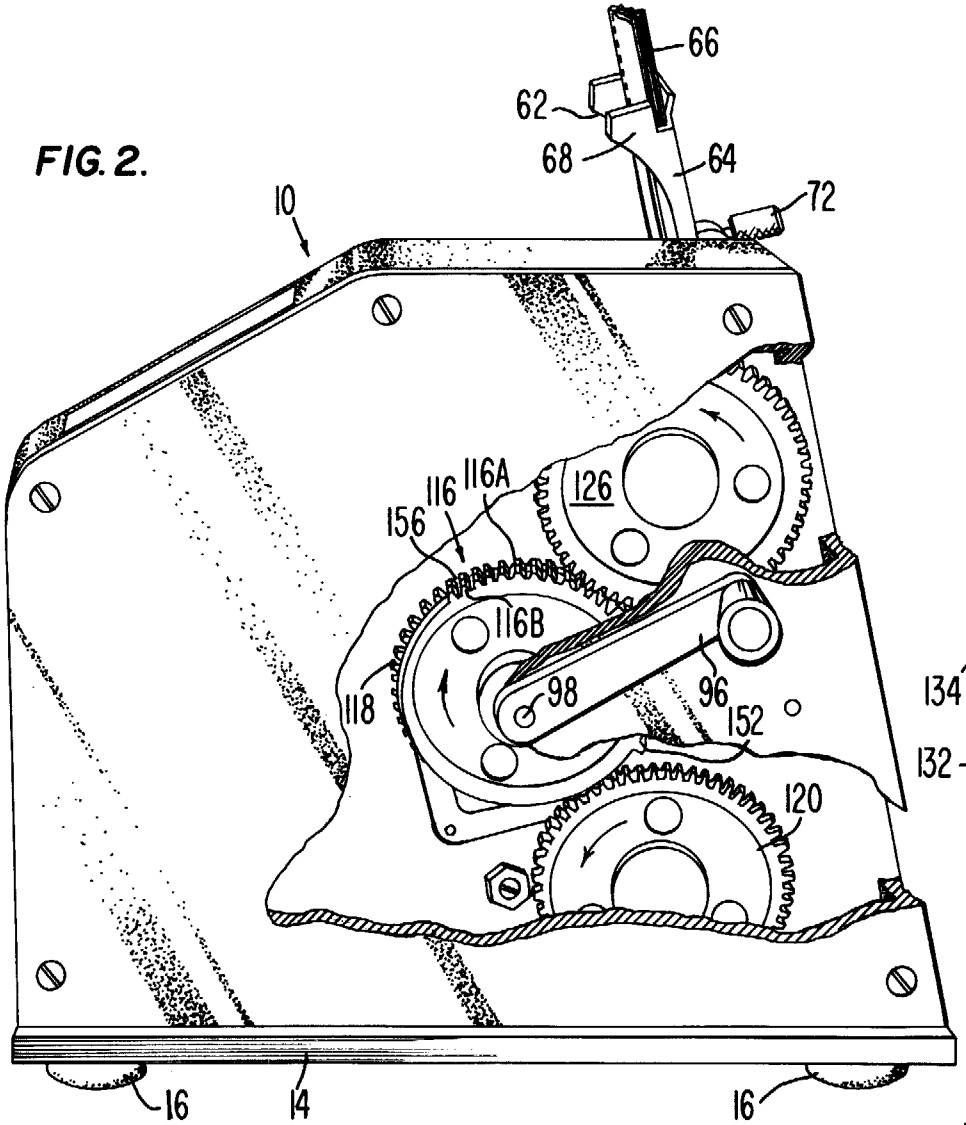
FIG. 2 is a right side elevational view of the device of FIG. 1 with portions partially broken away to expose internal mechanisms.
Figure 5:
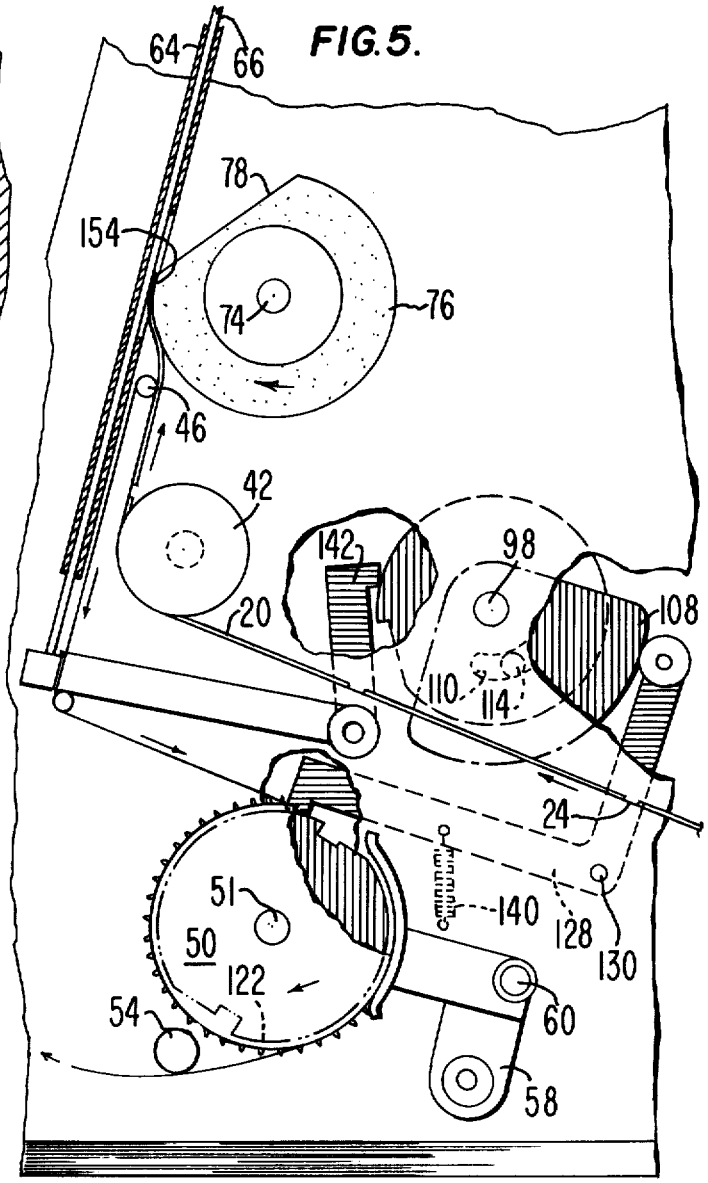
FIG. 5 is a side elevational view of a portion of the device illustrated in FIG. 1 showing the mechanism in operation.

Adjacent the turn bar 42 and slightly forward thereof (leftwardly in FIG. 1) are two vertically projecting channel or guide members 62 and 64, FIGS. 1 and 2, which together form an item or document receiving throat area for the document, e.g., savings bank passbook 66, FIGS. 2 and 7, employed therewith. Guide members 62 and 64 are substantially U-shaped throughout their length as seen in FIG. 5 and each is provided with a flaired portion 68 at the upper ends thereof, such portion being angled toward the operator (rightwardly in FIG. 1) for convenience of access thereto as will become more fully apparent as the description proceeds. Horizontally projecting rods 70 provide means for adjustably, slidably orienting guide members 62 toward and away from fixed guide members 64. The rods are split in two along their length and are assembled and disassembled by screwing one into the other. This permits ease of storage and shipment. The inner guide member 64 being fixed provides a fixed immovable reference surface against which the passbook is received and moved for accurate and precise location of the stripe 22. Thumb nuts 72 on channel member 62 permit adjustment thereof to be fixed so that the throat opening between the two guide members can be altered or changed to accomodate varying size documents or passbook items and thereafter rigidly secured against accidental dislodgement of movement during use or transport.

Disposed for rotation on a horizontally projecting shaft 74 is a magnetic patch applicator or attacher wheel 76 of resilient material such, for example, as rubber, etc. A flat area 78 is formed or cut into the wheel and acts, among other things, as a clearance cutout for passage of the item 66 during operation of the apparatus in a manner to be explained shortly. Adjacent the axial center of wheel 76 there is located a back-up anvil 80 adjustably attached to a shaft 82 projecting from wall 12. The anvil 80 is, as seen, eccentric on the shaft 82, thus to accomodate various thicknesses of document items, etc. so as to provide the desired degree of pressure between the wheel 76 and the anvil, thereby to drive the book or item out of the throat as the magnetic patch is attached thereto. Immediately above the applicator wheel 76 is an [acruately] *arcuately* movable roller member 84 biased by means of a spring 86 into the throat area or pathway of travel of the passbook 66. Roller 84 provides additional pressure against the magnetic patch to further assure that the patch is permanently secured on the passbook as the passbook is ejected from the apparatus.

Directly beneath the extreme lower end portion 88 of the passbook throat forming guides 62 and 64 is a clutch trip arm 90 rockably secured at its inboard end to a shaft 92 projecting through wall 12. The opposite outboard, free end of the trip arm 90 carries a horizontally projecting tang 94 which extends outwardly, perpendicularly to wall 12 into the path of the movement of the passbook 66 as it is lowered into throat area of the apparatus.

The apparatus of the present invention may be hand or motor operated depending upon the desired degree of automaticity required and the speed with which the operations employing the device are to be carried out. Hand operation will be described, it being noted that a motor of suitable size and horse power could be employed in substitution for the hand operation if such is desired.

Figure 3:
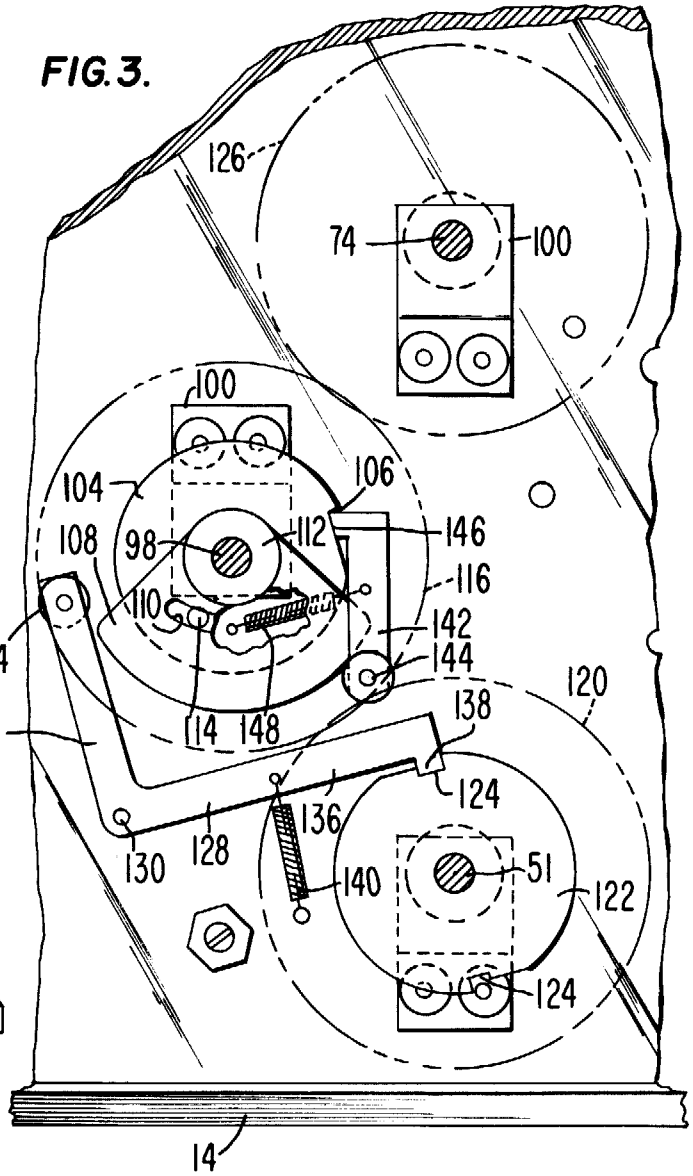
FIG. 3 is an enlarged view of a portion of the apparatus shown in FIG. 2 illustrating the cooperation of the elements therein.
Figure 4:
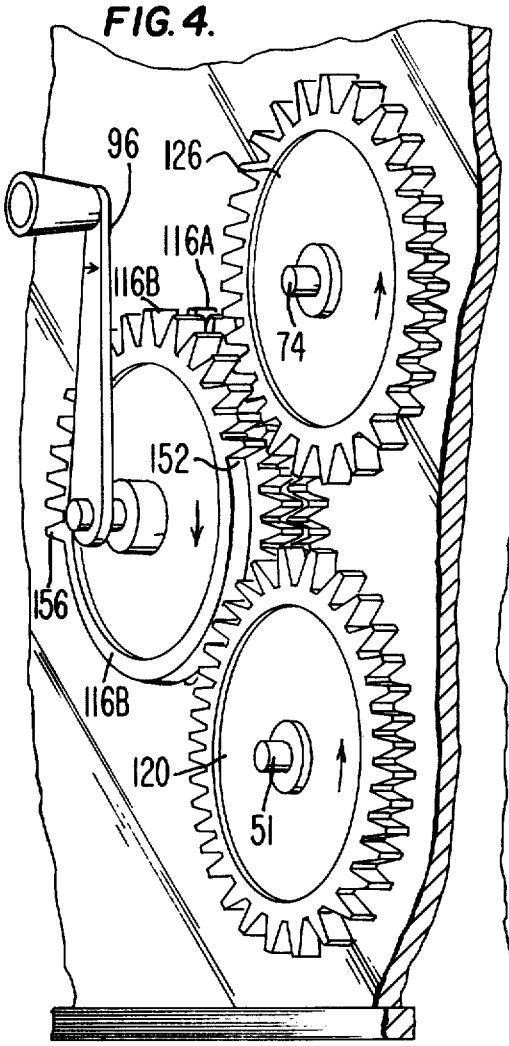
FIG. 4 is an isometric detail view of the gear train cluster including the hand crank drive of the invention.

As seen in FIGS. 2 and 4 particularly, the apparatus 10 is drivingly actuated by means of a hand crank 96 through a compound gear cluster and various cams and detents each of which will now be described. Hand crank 96 is secured to horizontal shaft 98 extending through vertical wall member 12, the latter being rigidly supported on both sides of wall 12 by means of rectangular shaft supports 100, 102. Adjacent shaft support 100 on the side opposite the reel of tape is rotatable hand crank detent member 104, FIG. 3, provided with a radial peripheral notch 106 for purposes to be explained shortly. Disposed in abutting relationship to detent 104 and on the same shaft is a triangularly shaped cam member 108 provided with an arcuately angled adjustment slot 110. Cam 108 is pinned to shaft 98 by means of a set screw through the spacer hub 112 thereof. The cam is arcuately adjustable after which it is fixed into position relative to the detent member 104 by means of a screw 114 projecting through the slot 110 and threaded into the detent 104.

Forwardly of cam 108 and abutting the hub 112 is a gear assembly 116 most clearly shown in FIGS. 2 and 4. Gear 116a of assembly 116 includes a full complement of peripheral teeth 118 while gear 116b of assembly 116 is provided with approximately one-half the total number of teeth of gear 116a as shown in FIG. 2 of the drawings. The gears 116a and 116b are secured together in abutting relationship as by bolts and are pinned to shaft 98 by means of a set screw enabling the gears to rotate as a unit with the shaft. A one-way clutch 119 disposed on shaft 98 couples the shaft to the crank 96 and effectively prevents reverse (counterclockwise) movement of the crank and shaft 98.

Immediately below and slightly to the right of gear assembly 116 as viewed in FIGS. 2 and 4, a gear wheel 120 similar to gear 116a is secured to and rotatable with shaft 51 carrying drive sprocket wheel 50. Gear 120 is adapted to mesh with the teeth of gear wheel 116b (having half the number of teeth as its companion gear) as will shortly be described. Concentrically mounted adjacent gear 120 on shaft 51 is a sprocket drive wheel detent 122 pinned to and rotatable with this shaft. Cut into the perimeter of the member 122 are two notches-124,-124 oppositely offset from one another by 180°, for purposes to be explained presently. Directly vertically above gear wheel 120 and on the same center line therewith is a gear 126 pinned to and rotatable with shaft 74, the opposite end of which carries patch attacher wheel 76.

Since the attachment of the magnetizable stripe to the item passbook 66 must necessarily be made at a fairly precise and accurately defined and oriented location thereon, means is provided for coordinating and synchronizing the operation of the apparatus in a relatively precise sequence of movements maintained invariant by means of the previously described detents in conjunction with operating pawls now to be described.

Slightly to the left and below cam 108 an L-shaped crank pawl 128 is rockably, pivotably mounted on a short stub shaft 130 in the wall 12 as seen in FIG. 3. The left, substantially vertically disposed portion 132 of pawl 128 carries at its extremity a roller 134 engagable with the peripheral surface or edge of cam 108. The rightwardly extending portion 136 of pawl 128 is provided with a projection or tang 138 receivable in notch 124 of detent 122. Pawl 128 is biased by means of spring 140 toward the detent 122. To the right of shaft 98, adjacent the perimeter of cam 108, is located a hand crank pawl 142 pivoted on a short stub shaft 144 carrying a projection 146 at the end thereof. Member 142 is biased by spring 148 so that projection 146 is receivable in notch 106 in detent 104. As viewed in FIGS. 1 and 3, the apparatus hereinbefore described is considered to be in the home, rest, or zero position with respect to the cams and detents and is illustrated with the detents 104 and 122 locking the gear train so as to prevent rotation of the hand crank.

With the apparatus in the condition illustrated in FIG. 1, that is to say, with a reel of tape loaded on the reel supports and with the tape carrying the magnetizable patches or labels fed over the pathway identified by the arrows 150 and with a mark 38 on the tape located opposite the mark 56 on the side of the sprocket wheel 50, the apparatus is ready for operation, as will now be described. The operator first inserts the document item or passbook 66 into the throat area bounded by the vertically canted channel members 62 and 64. The passbook is then pushed downwardly past the clearance cutout 78 in the attacher roller so as to bottom against the end 94 of trip arm 90 rocking the latter downwardly, i.e., counterclockwise, causing the crank pawl 142 to be rocked counterclockwise, i.e., to the left in FIG. 1, releasing the end 146 from the detent notch 106, enabling the hand crank 96, FIGS. 2 and 4, to be rotated in a clockwise direction. Rotation of the crank handle 96 causes the meshing gears to rotate in the direction of the arrows in FIG. 2 whereupon the leading tooth 152, FIGS. 2 and 4, of the half gear wheel 116b meshingly engages the teeth of gear 120 rotating the latter in the direction of the arrow thereon. Simultaneously cam lobe 108 contacts roller 134 rocking L-shaped member 128 counterclockwise lifting projection 138 out of the notch 124 in detent 122 permitting the sprocket drive wheel 50 to rotate advancing the tape.

Concurrently with the rotation of shaft 98 upper gear 126 meshing with gear 116a rotates the patch attacher resilient member 76 in a clockwise direction, FIG. 1, causing the leading edge 154 of the patch to be peeled outwardly, vertically away from the tape as a result of the abrupt change of direction of the tape as it passes over stud 46. Continued rotation of the crank handle causes the resilient patch attacher 76 to press the leading edge 154 of the patch against the exposed surface of the passbook 66. As the crank handle continues rotation, the patch attaching member presses the patch against the book which is in turn pressed against the back-up anvil 80 so that further rotation of the member 76 ejects the passbook vertically, upwardly securing the patch in transit to the book termination in a position in the throat area where the passbook 66 is free of constriction and can be removed to be replaced by a second passbook. As the hand crank rotates, the patch attacher 76 ultimately assumes a position with the cutout or flat portion 78 180° removed from the position shown in FIG. 1. At this point detent 122 has rotated counterclockwise to bring the notch 124 into position where the projection 138 of arm 128 once again seats therein. At this point in the rotation of the half gear wheel the last tooth 156 of the series has passed beyond and out of engagement with the gear teeth of the lower gear 120 so that sprocket wheel rotation is terminated halting the advancement of the tape. Continued rotation of the hand crank causes the detent 104 to rotate to the position shown in FIG. 3 wherein the projection 146 of the member 142 engages the notch 106 of the detent, locking the crank handle in a fixed position with the patch attacher roller 76 in its home position as shown in FIG. 1 ready to accept a fresh passbook.

The device of the present invention is adaptable for use with documents of varying thicknesses. Adjustment to accomodate such variance is provided by the eccentric back-up anvil which can be rotated about stud shaft 82 to alter the gap between the surface of the anvil and the periphery of resilient member 76.

There has thus been described a novel and heretofore unknown means for attaching magnetizable material to machine readable documents easily, simply, and economically with the magnetizable patch or label accurately positioned within prescribed limits with no accumulated feeding error and no partially exposed adhesive at the end of the cycle.

Apparatus as described and claimed herein is adapted for utilization with reading apparatus of the type described and claimed in U.S. Patent Applications; U.S. Ser. No. 186,203, filed Oct. 4, 1971, Hilliard R. DiVeto, A Machine Readable Magnetic Stripe and Reading Equipment Therefore and U.S. Ser. No. 224,781, filed Feb. 9, 1972, Albert C. Williamson et al., Automatic Reading and Writing Mechanism for Bank Passbooks and the Like.

What is claimed is:

1. Apparatus for applying [a magnetizable] *an* overlay, e.g. stripe, to an item or document such as a savings bank passbook comprising:

a supply of [magnetizable] tapes or patches, a document receiving area adjacent said supply of tape including document support means forming a throat into which said document is inserted and advanced, and thereafter retracted and removed, means adjacent said document receiving area for advancing an individual patch from said supply into contact with said document, means over which said patches are caused to pass effective to detach a patch from said supply for application to said document, and means for adhering said patch to said document while simultaneously removably retracting said document from said document receiving area.

2. The invention in accordance with claim 1 wherein said document receiving area includes oppositely disposed parallel channel guide members vertically oriented relative to the advancing path of movement of said patches for receiving said document and holding the same during the patch attaching and retracting operation.

3. Apparatus for applying [a magnetizable] *an* overlay, e.g. [magnetic] stripe, to an item or document such as a savings bank passbook comprising, a supply roll of [magnetizable] tapes or patches, each patch being spaced a precise distance from an adjacent patch and demountably adhered to a continuous strip of release material, means supporting said roll for free advancing movement, a document receiving throat into which a document is introduced and from which it is subsequently withdrawn, means for advancing said release material a precise incremental distance in synchronism with the spacing of said patches thereon, oppositely disposed projecting members in said throat area over which said release material is moved for causing each patch to be peeled away therefrom for application to said document, means in said throat area for adhering a released patch to said document and simultaneously withdrawing said document from said throat area, and means engagable with said document for actuating said advancing means and said adhering means to apply said patch while withdrawing said document from said throat area.

4. The invention in accordance with claim 2 wherein said channel guide members are independently, adjustably, laterally positionable so as to accommodate documents of varying size.

5. The invention in accordance with claim 3 wherein said means for adhering said patch comprises a resilient roller having a flat surface portion providing a clearance for said document as it enters said throat and an edge portion for gripping said patch as it is peeled from said release material.

6. The invention in accordance with claim 3 wherein said actuating means includes detent means operably associated with said tape roll advancing means, cam means engagable by said actuating means and movable thereby to release said tape advancing means to permit said tape to be moved, means engagable with said cam means for locking said advancing means in a fixed or home position at the end of an operational cycle.

7. Apparatus for applying a [magnetizable] stripe to an item such as a savings bank passbook comprising, means supporting a supply of continuous release material carrying a plurality of [magnetizable] patches thereon, a document receiving throat area into which said item is received and from which it is automatically extracted, parallel means in said throat area for peeling said patches from said release material one at a time,

[magnetizable] patch attaching means including a clearance portion for engaging said patch and a portion for extracting said item while attaching said [magnetic] patch thereto, means in said throat area adjacent said attaching means for varying the gap of said throat area as desired, means engagable with said release material for advancing the latter in synchronism with the positioning of said [magnetic] patches so as to accurately position each patch in a precise location on said item, and actuating means in said throat area engagable by said item for releasing said advancing means permitting the latter to move a [magnetic] patch into contact with said item for application thereto by said attaching means as the item is withdrawn from said apparatus.

8. The invention in accordance with claim 7 wherein said gap varying means comprises a rotatable cam member forming a back-up anvil for said patch attaching means, said cam member being arranged in eccentric relation to said patch attaching means permitting said throat gap to be widened or narrowed thus to accommodate documents of varying thicknesses.

9. The invention in accordance with claim 7 wherein said release material advancing means further includes anti-back-up means preventing said advancing means from reversing direction.

*10. An apparatus according to claim 1 wherein said patch has an adhesive backing on the surface to be bonded to said item and a stripe of magnetizable material on the opposite surface thereof.*

*11. An apparatus according to claim 3 wherein said patch has an adhesive backing on the surface to be bonded to said item and a stripe of magnetizable material on the opposite surface thereof.*

*12. An apparatus according to claim 7 wherein said patch has an adhesive backing on the surface to be bonded to said item and a stripe of magnetizable material on the opposite surface thereof.*

* * * * *